United States Patent
Ramasamy et al.

(10) Patent No.: US 11,427,744 B2
(45) Date of Patent: *Aug. 30, 2022

(54) WASTE VEGETABLE OIL-BASED EMULSIFIER FOR INVERT EMULSION DRILLING FLUID

(71) Applicant: Saudi Arabian Oil Company, Dhahran (SA)

(72) Inventors: Jothibasu Ramasamy, Dammam (SA); Md Amanullah, Dhahran (SA); Mujtaba M. Alsaihati, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 252 days.

This patent is subject to a terminal disclaimer.

(21) Appl. No.: 16/750,389

(22) Filed: Jan. 23, 2020

(65) Prior Publication Data
US 2020/0157403 A1    May 21, 2020

Related U.S. Application Data

(62) Division of application No. 15/812,694, filed on Nov. 14, 2017, now Pat. No. 10,577,527.

(51) Int. Cl.
*C09K 8/34* (2006.01)
*C11C 3/00* (2006.01)
(Continued)

(52) U.S. Cl.
CPC .............. *C09K 8/34* (2013.01); *C09K 8/36* (2013.01); *C09K 23/00* (2022.01); *C11C 3/00* (2013.01)

(58) Field of Classification Search
CPC ......... B01F 17/0021; C09K 8/34; C09K 8/36; C11C 3/00
See application file for complete search history.

(56) References Cited

U.S. PATENT DOCUMENTS 2,452,724 A  * 11/1948  Bradshaw .............. C11D 13/04
                                                      554/207
5,252,554 A    10/1993  Mueller et al.
(Continued)

FOREIGN PATENT DOCUMENTS

CN    103131398    6/2013
CN    103184038    7/2013
(Continued)

OTHER PUBLICATIONS

GCC Examination Report in GCC Appln. No. GC 2018-36458, dated May 31, 2021, 3 pages.
(Continued)

*Primary Examiner* — Alicia Bland
(74) *Attorney, Agent, or Firm* — Fish & Richardson P.C.

(57) ABSTRACT

A waste vegetable-oil based emulsifier for use as drilling mud primary emulsifier is described. A first emulsifier is prepared from an alkyl ester of waste vegetable oil. The waste vegetable oil is vegetable oil which has been used for a process prior to preparing the first emulsifier. A quantity of the first emulsifier is added to an oil-based drilling fluid. A quantity of an activating agent is added to the oil-based drilling fluid. The activating agent is configured to activate the emulsifier to stabilize an emulsion. A quantity of viscosifier is added to the oil-based drilling fluid. A quantity of a second emulsifier is added to the oil-based drilling fluid. A quantity of weigh-up material is added to the oil-based drilling fluid. The resulting oil-based drilling fluid is used in a wellbore drilling operation to drill a wellbore in a subterranean zone.

9 Claims, 5 Drawing Sheets

(51) Int. Cl.
  *C09K 8/36* (2006.01)
  *C09K 23/00* (2022.01)

(56) References Cited

U.S. PATENT DOCUMENTS

| | | |
|---|---|---|
| 8,563,482 B2 | 10/2013 | Amanullah |
| 2003/0130135 A1 | 7/2003 | Hou et al. |
| 2004/0002427 A1 | 1/2004 | Goncalves et al. |
| 2006/0057689 A1* | 3/2006 | Otto .................. C12P 7/6418 435/134 |
| 2008/0121564 A1 | 5/2008 | Smith |
| 2008/0121567 A1* | 5/2008 | Lin .................. B03D 1/02 209/5 |
| 2010/0173805 A1* | 7/2010 | Pomerleau .............. C09K 8/36 507/138 |
| 2012/0071369 A1 | 3/2012 | Amanullah |
| 2019/0144732 A1 | 5/2019 | Ramasamy et al. |

FOREIGN PATENT DOCUMENTS

| | | |
|---|---|---|
| CN | 103788934 | 5/2014 |
| CN | 104164224 | 11/2014 |
| CN | 104531107 | 4/2015 |
| CN | 104560411 | 4/2015 |
| CN | 104610946 | 5/2015 |
| CN | 106831409 | 6/2017 |
| CN | 106833556 | 6/2017 |
| EP | 2110429 | 10/2009 |
| WO | WO2008064469 | 6/2008 |

OTHER PUBLICATIONS

Caenn et al., "Chapter 1: Selection of the Drilling Fluid," in Composition and Properties of Drilling and Completion Fluids, 7th Edition, Fult Professional Publishing, Nov. 2, 2016, pp. 21-23, 3 pages.

Li et al., "An investigation on environmentally friendly biodiesel-based invert emulsion drilling fluid," Journal of Petroleum Exploration and Production Technology, vol. 6, Issue 3, Sep. 2016, 31 pages.

McBain et al., "The Hydrolysis of Soap Solutions, III. Values of pH and the Absence of Fatty Acid as Free Liquid or Solid," Journal of the American Oil Chemists Society, Nov. 5, 1948, 8 pages.

Sadecka and Szelag, "One-Step Synthesis of W/I and O/W Emulsifiers in the Presence of Surface Active Agents," Journal of Surfactants Deterg., vol. 16, Issue 3, May 2013, published online Sep. 2012, 11 pages.

Satyanarayana et al., "A comparative study of vegetable oil methyl esters (biodiesels)," Energy, vol. 36, No. 4, Apr. 1, 2011, 9 pages.

Gulf Cooperation Council Examination Report issued in GCC Application No. GC 2018-36458 dated Jun. 27, 2020, 10 pages.

PCT International Search Report and Written Opinion issued in International Application No. PCT/US2018/059438 dated Feb. 13, 2019, 21 pages.

Tianxiang et al., "Study on the extraction, separation and cleaning process of fatty acids from grapeseed oil and soapstock," Guizhou Environmental Protection Technology, 1997, 3(l):28-29, 8 pages, English Abstract only.

CN Office Action in Chinese Appln. No. 201880084653.9, dated May 6, 2022, 23 pages, with English Translation.

* cited by examiner

WASTE VEGETABLE OIL-BASED EMULSIFIER FOR INVERT EMULSION DRILLING FLUID

CROSS-REFERENCE TO RELATED PATENT APPLICATIONS

This application is a division of and claims the benefit of priority to U.S. patent application Ser. No. 15/812,694, filed Nov. 14, 2017, the contents of which are incorporated by reference herein.

TECHNICAL FIELD

This disclosure relates to drilling fluids, for example, wellbore drilling fluids to drill wellbores in hydrocarbon formations.

BACKGROUND

Wellbore drilling operations use wellbore drilling fluids for multiple purposes including, for example, to cool the drill bit, to transport wellbore cuttings from inside the wellbore to the surface, or similar purposes. Drilling fluids are also used to reduce friction between the drill string and the casing or the wellbore wall by acting as a lubricating medium for the drill string while drilling the wellbore. Drilling fluids can be divided into categories, for example, oil-based drilling fluids, water-based drilling fluids, or similar categories. Sometimes, additives are added into either or both categories of drilling fluids to enhance the properties of the drilling fluids.

SUMMARY

This specification describes technologies relating to a waste vegetable oil-based emulsifier for invert-emulsion oil-based mud formulation.

Certain aspects of the subject matter described here can be implemented as a method. A first emulsifier is prepared from an alkyl ester of waste vegetable oil. The waste vegetable oil is vegetable oil which has been used for a process prior to preparing the first emulsifier. A quantity of the first emulsifier is added to an oil-based drilling fluid. A quantity of an activating agent is added to the oil-based drilling fluid. The activating agent is configured to activate the emulsifier to stabilize an emulsion. A quantity of viscosifier is added to the oil-based drilling fluid. A quantity of a second emulsifier is added to the oil-based drilling fluid. A quantity of weigh-up material is added to the oil-based drilling fluid. The resulting oil-based drilling fluid is used in a wellbore drilling operation to drill a wellbore in a subterranean zone.

This, and other aspects, can include one or more of the following features. A ratio of the quantity of the first emulsifier to a quantity of the oil-based drilling fluid can be between 4 pounds of the first emulsifier per barrel of the oil-based drilling fluid and 12 pounds of the first emulsifier per barrel of the oil-based drilling fluid. A ratio of the quantity of the activating agent to a quantity of the oil-based drilling fluid can be substantially 4 grams of the activating agent per barrel of the oil-based drilling fluid. A ratio of the quantity of the viscosifier to a quantity of the oil-based drilling fluid can be substantially 4 grams of the viscosifier per barrel of the oil-based drilling fluid. A ratio of the quantity of the second emulsifier to a quantity of the oil-based drilling fluid can be substantially 6 grams of the second emulsifier per barrel of the oil-based drilling fluid. A ratio of the quantity of brine to a quantity of the oil-based drilling fluid can be substantially 85 milliliters of brine per barrel of the oil-based drilling fluid. The brine can include a quantity of calcium chloride dissolved in water. The brine can include substantially 61 grams of calcium chloride per 85 cubic centimeter of water. A ratio of the quantity of weigh-up material to a quantity of the oil-based drilling fluid can be substantially 161 grams of weigh-up material per barrel of the oil-based drilling fluid. Using the oil-based drilling fluid in the wellbore drilling operation to drill a wellbore in a subterranean zone can include flowing the oil-based drilling fluid through the wellbore while drilling the subterranean zone.

Certain aspects of the subject matter described here can be implemented as a method. A raw material waste vegetable oil is esterified to produce a methyl ester of the raw material waste vegetable oil. A caustic soda solution is added to the methyl ester resulting in a mixture. The mixture is thermally treated. A pH of the mixture is adjusted resulting in formation of an aqueous phase and a non-aqueous phase. The aqueous phase is separated from the non-aqueous phase.

This, and other aspects, can include one or more of the following features. The caustic soda solution can include an alkoxide dissolved in a solvent. The alkoxide can include sodium hydroxide. The solvent can include water. The mixture can be stirred during thermally treating the mixture. The mixture can be heated to a temperature greater than room temperature. The temperature can be substantially 60° C. Acid can be added to adjust the pH of the mixture. The acid can be substantially 31% hydrochloric acid. The adjusted pH of the mixture can be substantially between 4 and 5.

The details of one or more embodiments of the subject matter described in this specification are set forth in the accompanying drawings and the description that follows. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Water-based drilling fluids may not be a viable drilling fluid option for certain high pressure and high temperature (HPHT) sections of a borehole due to the extreme drilling conditions. For such HPHT sections, invert emulsion oil based mud (OBM) can be used as drilling fluids. OBMs can also be used as drilling fluids when drilling reactive shale section to stabilize the shale. Certain oil-based drilling fluids, such as the invert emulsion OBM include emulsifiers to create a stable emulsion of water in oil. Emulsifiers are a type of surfactants that have a hydrophilic head group and a hydrophobic tail (for example, a long chain hydrophobic tail). Emulsifiers can reduce interfacial tension between water and oil phases to achieve stability of the drilling fluid.

This disclosure describes an ecofriendly emulsifier that can be used in oil-based drilling fluids, such as invert emulsion OBMs or similar oil-based drilling fluids. In some implementations, the emulsifier is used as a primary emulsifier in an invert emulsion oil based mud formulation used as a drilling fluid in HPHT sections of a borehole or when drilling highly reactive shale section to stabilize the shale. In general, the emulsifier can be used in OBM that is used in rock formations where high friction and torque are expected or in high extended reach wells (or both). Example ratios of oil to water and concentrations of the emulsifier in the formulation are described later. The emulsifier described here is a primary additive used in invert emulsion OBMs to create stable emulsion of water in oil. The emulsifier can reduce interfacial tension between water and oil phases to increase stability of the drilling fluid.

The emulsifier is a type of surfactant that has both hydrophilic head group and long chain hydrophobic tail. In this disclosure, an ecofriendly emulsifier is prepared using vegetable oil, particularly, used or processed vegetable oil, which can be obtained, for example, from the food industry. Vegetable oil is a triglyceride extracted from a plant. A triglyceride is an ester of glycerol and three fatty acids. Depending on the source, vegetable oil contains a mixture of different types of fatty acids, for example, saturated, mono unsaturated, poly unsaturated, omega 3, omega 6 or omega 9 fatty acid. Most of the vegetable oils commonly used for cooking (for example, olive oil, palm oil, sunflower oil, corn oil, peanut oil, or similar vegetable oil commonly used for cooking food) contains one or more or all of these fatty acids. The presence of these different types of fatty acids makes vegetable oil a promising source for emulsifiers for drilling fluids. Vegetable oils that have been used for cooking and been disposed as waste could be used as a sustainable source for emulsifier synthesis. Unused or unprocessed vegetable oil can also be used for the emulsifier synthesis described here.

Figure 1:
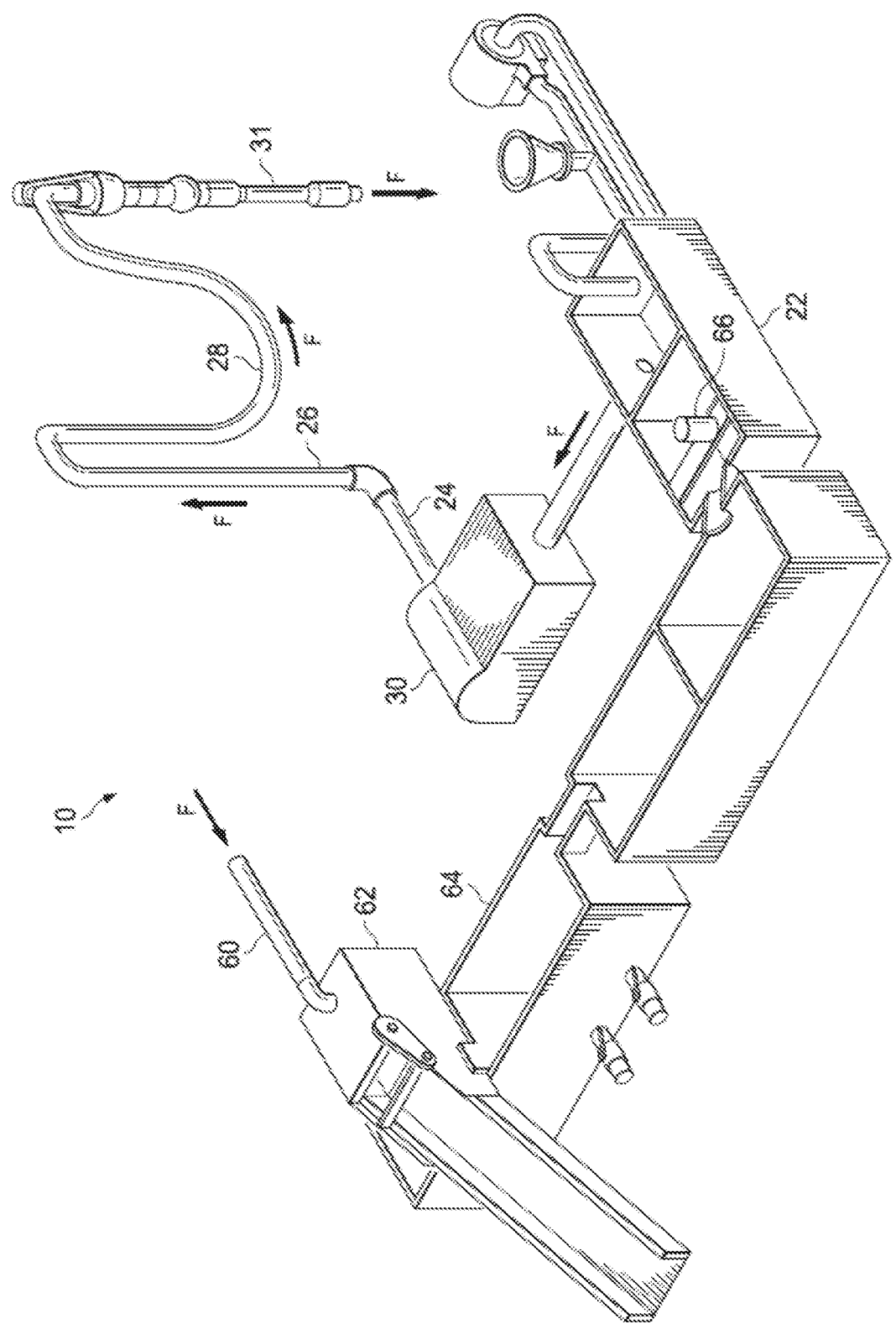
FIG. 1 is a schematic diagram of a drilling fluid circulation system.
Figure 2:
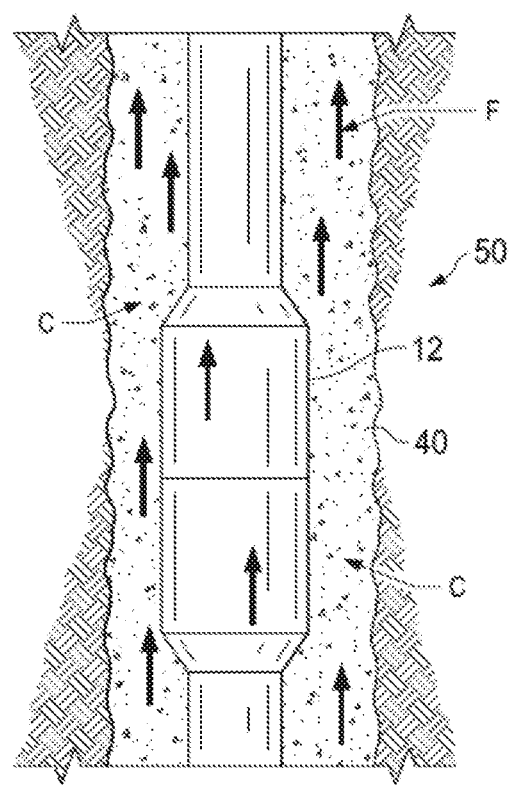
FIG. 2 is a schematic diagram showing drilling fluid flowing through a drill string and an annulus between the drill string and a wellbore.

FIG. 1 is a schematic diagram of a drilling fluid circulation system 10. FIG. 2 is a schematic diagram showing drilling fluid flowing through a drill string 12 and an annulus 40 between the drill string 12 and a wellbore 50. In wellbore drilling situations that use a drilling rig, a drilling fluid circulation system 10 circulates (or pumps) drilling fluid (for example, drilling mud) with one or more mud pumps. The drilling fluid circulation system 10 moves drilling fluid (mud, F) down into the wellbore 50 through a drill string 12, and drill collars which are connected to the drill string 12. The drilling fluid exits through ports (jets) in the drill bit, picking up cuttings C and carrying the cuttings of the annulus 40 of the wellbore 50. The mud pump 30 takes suction from mud tank 22 and pumps the drilling fluid F out discharge piping 24, up with the standpipe 26, through rotary hoses 28, through Kelly or top drive unit 31, and into a central bore of the drill string 12, drill collars and drill bit. Drilling fluid F and cuttings C returned to the surface of the annulus 40. At the surface, the drilling fluid and cuttings leave the wellbore 50 through an outlet (not shown) and are sent to a cuttings removal system via mud return line 60. At the end of the return lines, drilling fluid F and cuttings C are flowed onto a vibrating screen, for example, a shale shaker 62. Finer solids can be removed using a sand trap 64. The drilling fluid can be treated with chemicals stored in a chemical tank 66 and then provided into the mud tank 22, wherein the process can be repeated.

The drilling fluid circulation system 10 delivers large volumes of drilling fluid under pressure for the drilling rig operations. The circulation system 10 delivers the drilling fluid to the drill stem to flow down the drill string 12 and out through the drill bit appended to the lower end of the drill stem. In addition to cooling the drill bit, the drilling fluid hydraulically washes away debris, rock chips, and cuttings, which are generated as the drill bit advances into the wellbore 50. Thus, the drilling fluid is an important part of the component drilling operation which can be flowed through wellbore drilling system components, for example, as rotary, coiled tubing, casing, or similar components, in different wellbore drilling operations, for example, under balance drilling, overbalanced drilling, or similar drilling operations, to perform several functional tasks and facilitate safe, trouble-free and economical drilling.

Figure 3:
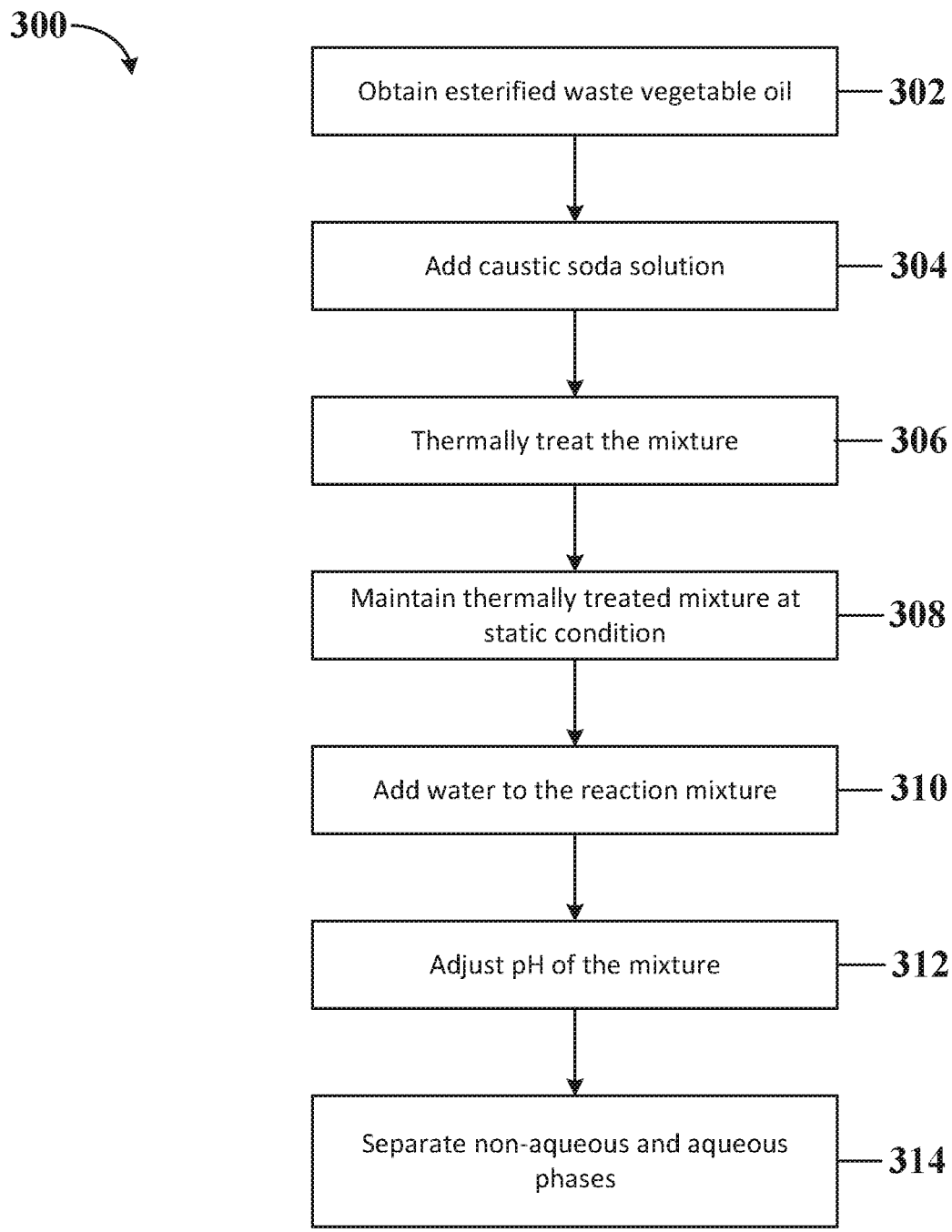
FIG. 3 is a flowchart of an example process of producing emulsifier using esterified waste vegetable oil.

FIG. 3 is a flowchart of an example process 300 of producing emulsifier using esterified waste vegetable oil. In some implementations, the emulsifier can be used in other wellbore fluids, for example, fracturing fluids, completion fluids, stimulation fluids, combinations of them, or similar wellbore fluids. At 302, esterified waste vegetable oil is obtained. In some implementations, a methyl ester of waste vegetable oil is obtained. For example, waste vegetable oil (that is, vegetable oil that has been used for cooking) is esterified to prepare a methyl ester.

At 304, a caustic soda solution is added to the methyl ester of the waste vegetable oil. In some implementations, the caustic soda solution can be prepared by dissolving a quantity of sodium hydroxide in water. In some implementations, the caustic soda solution can be added to the methyl ester of the waste vegetable oil over a period of time that is sufficient for the caustic soda solution and the methyl ester to be mixed. The caustic soda solution can be added at an optimal rate at which the formation of suspension is delayed, as hastened formation of suspension will hinder the caustic soda reaction with methyl ester. Adding the caustic soda solution changes the reaction mixture into a suspension.

At 306, the mixture is thermally treated. In some implementations, the mixture can be stirred (or otherwise agitated) for a certain duration at a temperature that is greater than room temperature. Stirring facilitates and increases contact between the caustic soda and methyl ester. Heating at the temperature creates Brownian motion of the reaction mixture and accelerates reaction kinetics.

At 308, the thermally treated mixture is maintained at a static condition. In some implementations, the agitation of the thermally treated mixture and the heating can be ceased allowing the mixture to cool to room temperature. No other thermal treatment need then be performed on the mixture. Maintaining the mixture at the static condition can allow the methyl groups to be cleaved off, resulting in the emulsifier.

At 310, water is added to the reaction mixture to separate the oil and water phases, thereby isolating the emulsifier. The water volume can be 15-30% of the oil volume taken initially for the reaction.

At 312, the pH of the mixture is adjusted. In some implementations, the pH is adjusted by adding an acid to the reaction mixture until the pH of the mixture reaches a level at which an oil phase separates out from the reaction mixture.

At 314, the non-aqueous and aqueous phases are separated. In some implementations, the two phases are separated by first transferring the reaction mixture to a separation flask, from which the aqueous phase is removed. In some implementations, additional water can be added to the separation flask to wash and remove any remaining inorganic salts in the non-aqueous phase. The remaining non-aqueous phase along with emulsion is left in static condition to allow the emulsion to de-foam. The de-foamation may further release water, which can be removed as described earlier. The non-aqueous phase from which the foam has been removed is available as the emulsifier for use as described in this disclosure.

Figure 4:
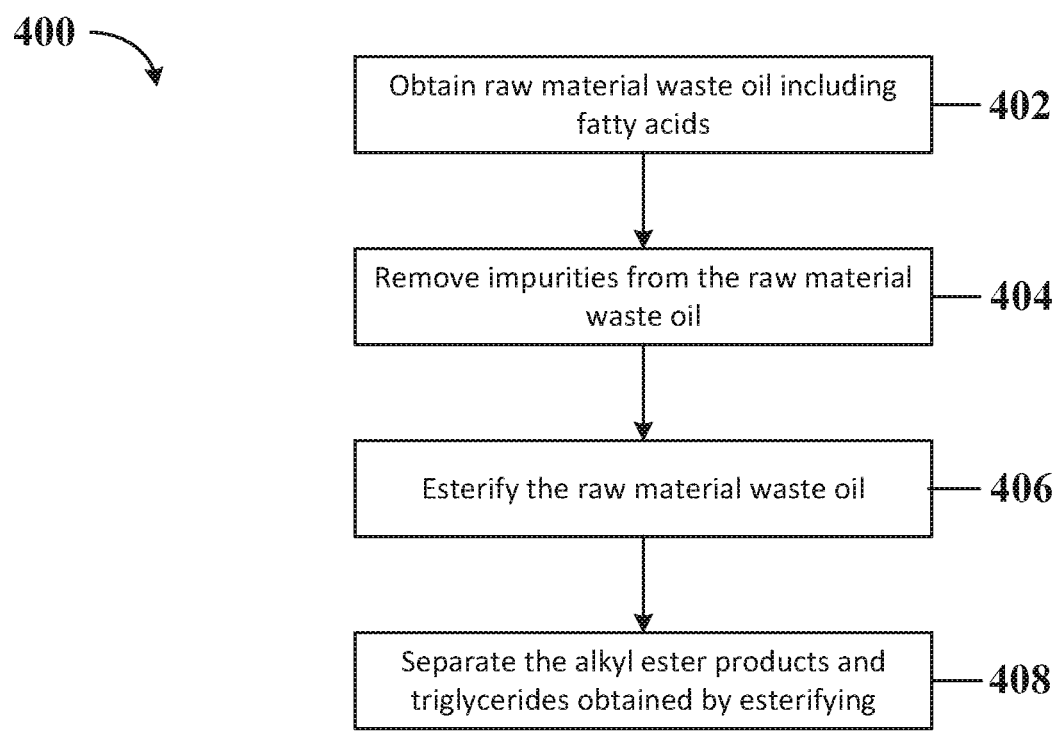
FIG. 4 is a flowchart of an example process of producing esterified waste vegetable oil.

FIG. 4 is a flowchart of an example process 400 of producing esterified waste vegetable oil. For example, the esterified waste vegetable oil produced by implementing process 400 can be used to produce the emulsifier by implementing the process 300. In some implementations, the additive can be used in wellbore fluids, for example, drilling fluids (specifically, oil-based drilling fluids), fracturing fluids, completion fluids, stimulation fluids, combinations of them, or similar wellbore fluids.

At 402, the waste vegetable oil including fatty acids is obtained. In some implementations, the waste vegetable oil can be processed vegetable oil produced as a byproduct by the food industry.

The waste vegetable oil can have a plastic viscosity of greater than substantially 50 centipoise (cP) or 60.8 cP measured using a multi-speed rotational viscometer. The waste vegetable oil can have a plastic viscosity ratio of waste vegetable oil to mineral oil that is greater than substantially 10 (for example, substantially 11.18). As used in this disclosure, the term "substantially" permits a variation of up to 5% from any mentioned value. The waste vegetable oil can have a plastic viscosity ratio of more than substantially 20 with respect to the plastic viscosity of a refined oil produced by Safra (Jeddah, Saudi Arabia) and used for offshore drilling. The waste vegetable oil can have a plastic viscosity ratio of substantially 24.12 with respect to the refined oil produced by Safra and used for offshore drilling. The waste vegetable oil can have a plastic viscosity ratio of more than substantially 10 with respect to the plastic viscosity of mineral oils that are used for oil-based drilling fluid formulations.

The waste vegetable oil can include fatty acids with a short chain alcohol. The short chain alcohol can include at least one or more of methanol, ethanol, propanol, butanol, or combinations of them. The fatty acids can include molecules averaging substantially from 16 carbon atoms to less than 20 carbon atoms.

At 404, impurities are removed from the waste vegetable oil. The impurities, for example, food residues, can reduce the functional capability of the waste vegetable oil. In some implementations, the waste vegetable oil can be filtered, for example, quick filtered, at low pressure, for example, a pressure range of substantially 5 pounds per square inch (psi) to substantially 10 psi. Impurities can be removed from the waste vegetable oil using alternative or additional methods.

At 406, the raw material waste oil is esterified. In some implementations, the raw material waste oil is esterified in the presence of a catalyst to produce alkyl ester products and triglycerides. The catalyst can include at least one of sodium hydroxide, potassium hydroxide, sodium alkoxide, potassium alkoxide, or combinations of them. For example, the waste vegetable oil can be esterified with methanol in the presence of sodium hydroxide. At 408, the alkyl ester products and triglycerides are separated. Example techniques for implementing portions of process 400 to produce the esterified waste vegetable oil are described later. Alternative techniques can be implemented to produce the esterified waste vegetable oil.

Removal of Impurities and Excess Water

A low pressure filtration cell can be used to remove impurities, for example, burnt and unburned food residue, present in the waste vegetable oil. The low pressure filtration cell can include filter paper that has pore sizes that were less than 5 μm to remove impurities that were larger than 5 μm. A constant pressure of 5-10 psi can be used on the low pressure cell for quick filtration of a volume of the waste vegetable oil. Other filtration media or adsorbents that are capable of removing all impurities and excess water from the waste vegetable oil can be used as alternatives or in addition to the low pressure filtration cell. For example, a multi-cell filtration apparatus can be used for removing the impurities.

Determination of Quantity of Catalyst

A quantity of catalyst required to process the waste vegetable oil can be determined by titration method. To do so, for example, 1 milliliter (mL) of waste vegetable oil can be mixed with 10 mL of isopropyl alcohol of 99.2% purity. To this mixture, 2-3 drops of an indicator fluid (for example, phenolphthalein, or similar indicator fluid) can be added. The indicator fluid can be added drop-by-drop into the agitated waste vegetable oil until the color changes to pink. After the endpoint, the mixture can be stirred for a while to check the permanency of the pink color. The titration test can be repeated three times to calculate the average amount of catalyst required to reach the endpoint. After determining the average value of sodium hydroxide (NaOH) based on the titration test results, a constant value (for example, 3.5 grams (g)) can be added to determine the total amount of catalyst (for example, between 4.18 g and 4.22 g) required for 1 liter (L) of waste vegetable oil.

Esterification to Remove Triglycerides

The viscosity of the waste vegetable oil can be reduced to match the mineral oil viscosity by esterifying the base oil using methanol. To do so, a volume of methanol, for example, 20% original waste vegetable oil volume, and the mass of NaOH (for example, 4.22 g NaOH/liter of waste vegetable oil) can be mixed in a dry condition using a magnetic stirrer and then added to the waste vegetable oil in a container. The mixture can then be stirred for six hours using the magnetic stirrer to complete the interactions.

Sedimentation

The total reaction product can be allowed to stay in static conditions overnight to complete the sedimentation of glycerol and sludge at the bottom of the container. During the initial settling phase, emulsion formed, for example, due to the presence of some emulsion forming byproducts in the ester layer, can be broken by heating the processed mass at substantially 80° C. or adding substantially 10 mL of acetic acid per liter of waste vegetable oil to break and prevent the emulsion formation.

Separation and Washing of Esterified Oil

After complete sedimentation, the top clear esterified oil was decanted slowly and washed for several hours using water while stirring with a magnetic stirrer. Then, the esterified oil and the washed water were kept in static condition overnight for effective separation of oil and water phases. The separated oil phase was decanted slowly to remove it from the water phase. The process of washing was repeated, for example, twice.

Figure 5:
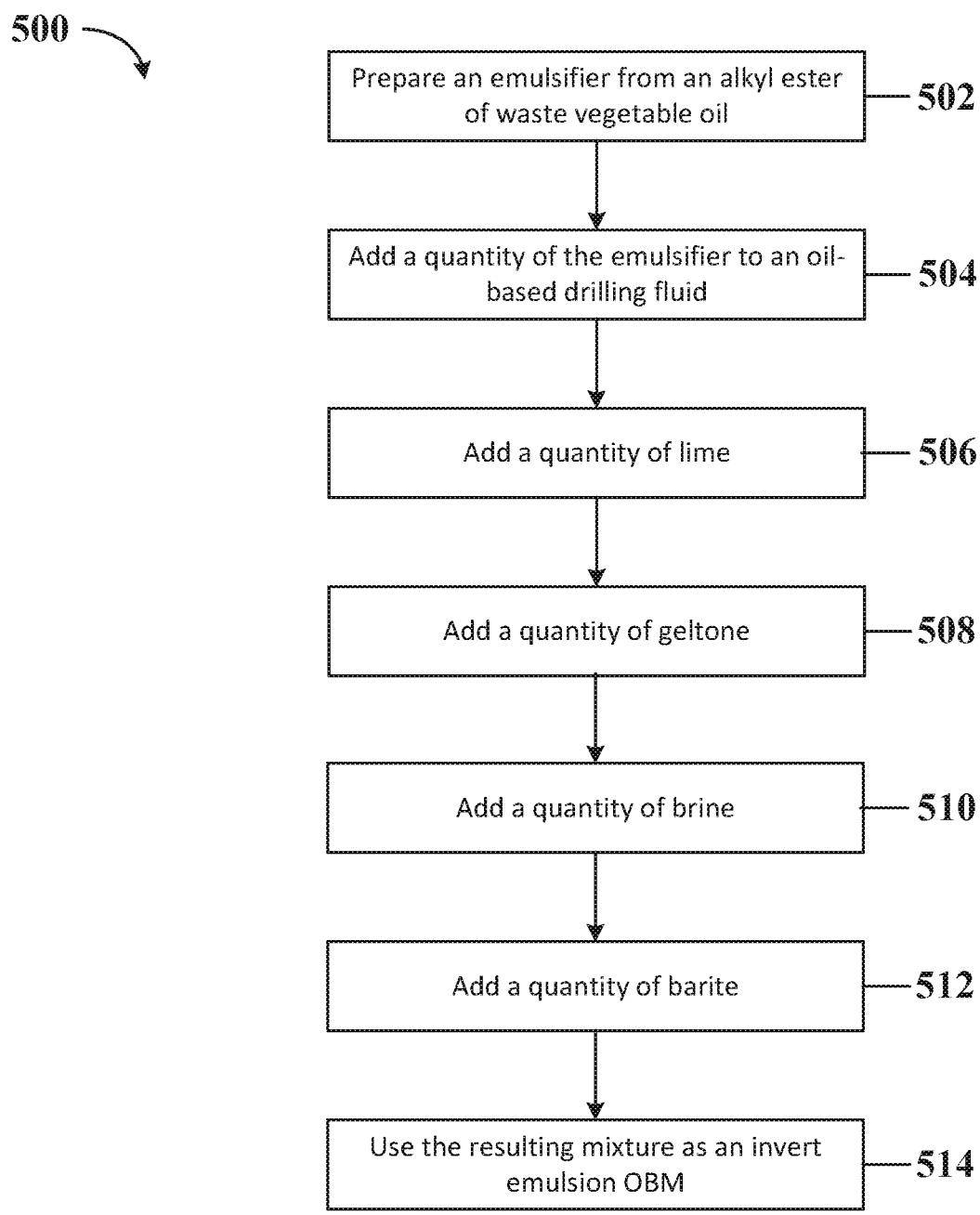
FIG. 5 is a flowchart of an example process for using the emulsifier produced by the example process of FIG. 3 in an oil based drilling fluid.

FIG. 5 is a flowchart of an example process 500 for using the emulsifier produced by the example process of FIG. 3 in an oil based drilling fluid. The process 500 can be implemented, in part, for example, at a surface of a wellbore and, in part, for example, within the wellbore. In addition, the process 500 can be implemented, in part, for example, in a laboratory, and, in part, for example, in the field. Moreover, the process 500 can be implemented, in part, by a laboratory technician, and, in part, by a field technician, for example, the wellbore operator.

At 502, an emulsifier is prepared from an alkyl ester of waste vegetable oil. For example, the emulsifier is prepared by implementing the example process 300 described earlier with reference to FIG. 3. In some implementations, the waste vegetable oil can be vegetable oil which has been used for a process prior to preparing the emulsifier.

At 504, a quantity of the emulsifier is added to the oil-based drilling fluid to which the emulsifier has been added. A ratio of the quantity of the emulsifier to the quantity of the oil-based drilling fluid can range between 4 pounds (lbs) to 12 lbs of the emulsifier per barrel of the oil-based drilling fluid. A barrel of the oil-based drilling fluid contains substantially 159 liters of the drilling fluid.

At 506, a quantity of lime is added to the oil-based drilling fluid to which the previously mentioned components have been added. A ratio of the quantity of the lime to the quantity of the oil-based drilling fluid can be substantially 6 g of lime per barrel of the oil-based drilling fluid. The lime activates the emulsifier, which then stabilizes the emulsion. The quantity of lime is related to the quantity of emulsifier. For example, the ratio of lime to emulsifier can range between 1:1 and 1:2.

At 508, a quantity of viscosifier is added to the oil-based drilling fluid to which the previously mentioned components have been added. A ratio of the quantity of the viscosifier to the quantity of the oil-based drilling fluid can be substantially 4 g of viscosifier per barrel of the oil-based drilling fluid. The viscosifier can be an organophilic clay. For example, the quantity of viscosifier can range from 2 g to 6 g.

At 510, a quantity of brine is added to the oil-based drilling fluid to which the previously mentioned components have been added. A ratio of the quantity of brine to the quantity of the oil-based drilling fluid can be substantially 85 milliliters (ml) of brine per barrel of the oil-based drilling fluid. Calcium chloride in brine is used in OBM to capture water from shale formation and stabilize the shale section. In some implementations, the brine can include a quantity of calcium chloride (for example, substantially 61 g) mixed with water (for example, substantially 85 cubic centimeters).

At 512, a quantity of weigh-up material is added to the oil-based drilling fluid to which the previously mentioned components have been added. A ratio of the quantity of the weigh-up material to the quantity of the oil-based drilling fluid can be substantially 161 g of weigh-up material per barrel of the oil-based drilling fluid. The weigh-up material can be an inert material added to the drilling fluid to adjust the density of the OBM to the desired level. The quantity of the weigh-up material depends on the desired mud density.

At 514, the oil-based drilling fluid mixed with the previously mentioned components is used in a wellbore drilling operation to drill a wellbore in a subterranean zone. For example, multiple barrels of the oil-based drilling fluid are prepared, each barrel mixed with the previously-mentioned components. The multiple barrels are flowed through a subterranean zone while drilling a wellbore in the subterranean zone.

Example Process to Produce the Emulsifier

The process 300 to produce the emulsifier was implemented as described here.

In the example described here and throughout this disclosure, the term "substantially" represents a permissible deviation of 5% from a disclosed quantity. Substantially 300 milliliters (mL) of methyl ester of waste vegetable oil was taken in a beaker having a magnetic stirring bar and placed on a hot plate stirrer. The methyl ester was stirred at substantially 500 rotations per minute (rpm). A caustic soda solution was prepared by dissolving substantially 15 grams (g) of sodium hydroxide in 50 mL of water. The caustic soda solution was added to the methyl ester over a period of substantially two minutes, which turned the reaction mixture into a suspension. The reaction mixture was stirred for substantially 6 hours at substantially 60° C., and then allowed to be static for substantially 16 hours, which resulted in the reaction mixture becoming thick and of semi-solid consistency. Substantially 50 mL of water was added to the mixture. Hydrochloric acid (substantially 31%) was added drop-by-drop to the reaction mixture until the pH of the reaction mixture was around 4-5, upon which an oil phase separated out from the reaction mixture. The reaction mixture was transferred to a separation flask. The aqueous phase, which was separated from the non-aqueous phase by an emulsion layer, was removed from the separation flask. Substantially 50 mL of water was added to the remaining non-aqueous phase in the separation flask for washing and removing of any inorganic salts that remained in the non-aqueous phase. The aqueous phase formed again was removed from the separation flask, and the step was repeated. The remaining non-aqueous phase along with the emulsion was left in static condition to allow de-foamation of the emulsion. Water released upon de-foamation was removed from time to time. Finally, the non-aqueous phase was collected as a colorless liquid.

Example Process to Produce the Invert Emulsion OBM

In one example, a total of 350 ml of invert emulsion OBM was produced using 218 ml of Safra oil as the base OBM. To the Safra oil, 12 ml of the emulsifier produced by implementing the process 300 described earlier was added. To this mixture, 4 ml of EZ-mul was added. EZ-Mul is a secondary emulsifier used as a wetting agent for solids. To this mixture, 6 g of a activating agent, 4 g of a viscosifier, 6 g of an emulsifier, 85 ml of brine and 161 g of weigh-up material were added. The brine was solution of 61 g of calcium chloride in 85 cubic centimeter (cc) of water. The mixture was hot rolled for 16 hours at 300 degree Fahrenheit (° F.) and 500 pounds per square inch (psi). The resulting invert emulsion OBM had a plastic viscosity of 24.2 cP, a yield point of 11.2° F., American Petroleum Institute (API) spurt loss of zero ml, API fluid loss of 0 ml, HPHT spurt loss of 0 ml (at 300° F. and 500 psi) and HPHT fluid loss of 3.4 ml (at 300° F. and 500 psi).

In another example, samples of invert emulsion OBM were produced as described in the preceding paragraph, except that the concentration of the emulsifier was varied to be 6 ml, 4 ml and 0 ml. For such samples, the plastic viscosities were 35 cP, 34 cP and 30 cP, respectively. The yield points were 12° F., 17° F. and 30° F., respectively. The API spurt losses were 0 ml, 0 ml and 0.2 ml, respectively. The API fluid losses were 1 ml, 2 ml and 9.3 ml, respectively. The HPHT spurt losses were 2 ml, 6 ml and 8 ml, respectively (at 300° F. and 500 psi). The HPHT fluid losses were 7 ml, 18 ml and 68 ml, respectively (at 300° F. and 500 psi). In sum, for concentrations ranging between 4 ml and 12 ml of emulsifier per 218 ml of Safra oil, the invert emulsion OBMs showed very good rheological properties and applicability as oil-based drilling fluids Thus, particular implementations of the subject matter have been described. Other implementations are within the scope of the following claims.

The invention claimed is:

1. A method comprising:

adding a caustic soda solution to a methyl ester of waste vegetable oil resulting in a mixture;

cleaving an ester group of the methyl ester to produce an emulsifier of the waste vegetable oil;

thermally treating the mixture;

adjusting a pH of the mixture resulting in formation of an aqueous phase and a non-aqueous phase; wherein adjusting the pH of the mixture comprises adding an acid; and separating the aqueous phase from the non-aqueous phase.

2. The method of claim 1, wherein the caustic soda solution comprises an alkoxide dissolved in a solvent.

3. The method of claim 2, wherein the alkoxide comprises sodium hydroxide.

4. The method of claim 2, wherein the solvent comprises water.

5. The method of claim 1, further comprising stirring the mixture during thermally treating the mixture.

6. The method of claim 1, wherein the mixture is heated to a temperature greater than room temperature.

7. The method of claim 6, wherein the temperature is substantially 60° C.

8. The method of claim 1, wherein the acid is substantially 31% hydrochloric acid.

9. The method of claim 1, wherein the adjusted pH of the mixture is substantially between 4 and 5.

\* \* \* \* \*